(12) United States Patent
Tang et al.

(10) Patent No.: US 9,334,996 B2
(45) Date of Patent: May 10, 2016

(54) JOINT STRUCTURE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Lie-Wen Tang, Shenzhen (CN); Quan Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 98 days.

(21) Appl. No.: 14/243,996

(22) Filed: Apr. 3, 2014

(65) Prior Publication Data

US 2014/0299211 A1    Oct. 9, 2014

(30) Foreign Application Priority Data

Apr. 8, 2013   (CN) .......................... 2013 1 0119127

(51) Int. Cl.
*F16L 37/407*   (2006.01)
(52) U.S. Cl.
CPC ........ *F16L 37/407* (2013.01); *Y10T 137/87161* (2015.04); *Y10T 137/87957* (2015.04); *Y10T 137/9029* (2015.04)
(58) Field of Classification Search
CPC ......... F16L 37/40; F16L 37/407; F16L 29/02; F16L 37/44; F16L 37/33; F16L 29/04; Y10T 137/9029; Y10T 137/87957; Y10T 137/87949; Y10T 137/87153; Y10T 137/87161; F16N 21/04
USPC ........................................... 251/149.6, 149.7
See application file for complete search history.

(56) References Cited

U.S. PATENT DOCUMENTS

| 565,770 | A | * | 8/1896 | Miles | F16K 31/44 248/53 |
|---|---|---|---|---|---|
| 653,728 | A | * | 7/1900 | Burkitt | F16L 37/40 184/105.3 |
| 956,531 | A | * | 5/1910 | Johnson | F16L 37/40 251/149.7 |
| 1,345,571 | A | * | 7/1920 | Yates | F16L 29/04 137/614 |
| 1,740,015 | A | * | 12/1929 | Hooper | F16L 37/096 251/149.6 |
| 1,807,636 | A | * | 6/1931 | Robin | F16L 37/40 251/149.6 |

(Continued)

FOREIGN PATENT DOCUMENTS

| CN | 202791067 U | 3/2013 |
|---|---|---|
| TW | 508418 B | 11/2002 |
| WO | 95/24583 A1 | 9/1995 |

*Primary Examiner* — Mary McManmon
*Assistant Examiner* — David Colon Morales
(74) *Attorney, Agent, or Firm* — Novak Druce Connolly Bove + Quigg LLP (57) ABSTRACT

Joint structure includes a joint plug assembly and a joint outlet assembly. The joint plug assembly includes a plug body, a sealing member, and a flexible member. The plug body defines a receiving channel including a first receiving hole and a second receiving hole communicating with the first receiving hole. A diameter of the second receiving hole is smaller than that of the first receiving hole. The plug body includes a spherical outer surface. The flexible member biases the sealing member to block the second receiving hole. The joint outlet assembly includes an outlet body and a pin. The outlet body defines a latching groove, and the latching groove forms a spherical inner surface. The pin is received in the latching groove and defines at least one groove along a longitudinal direction thereof.

20 Claims, 6 Drawing Sheets

(56) References Cited

U.S. PATENT DOCUMENTS

| | | | | |
|---|---|---|---|---|
| 2,362,880 A * | 11/1944 | Campbell | ............... | F16N 21/04 184/105.1 |
| 3,078,068 A * | 2/1963 | Romney | ............... | F16L 37/101 137/614.03 |
| 3,670,770 A * | 6/1972 | Nelson | ............... | F16L 37/26 137/614.02 |
| 3,704,002 A * | 11/1972 | Skarzynski | ............... | F16L 37/23 137/614.06 |
| 4,105,046 A * | 8/1978 | Sturgis | ............... | E02F 3/627 137/594 |
| 4,269,219 A * | 5/1981 | Dybvig | ............... | F02M 37/0023 137/322 |
| 4,428,560 A * | 1/1984 | Erdelsky | ............... | F16L 37/252 137/231 |
| 4,728,076 A * | 3/1988 | Ganshorn | ............... | F16L 37/12 251/149.6 |
| 4,745,674 A * | 5/1988 | Abe | ............... | B23B 31/1071 279/4.04 |
| 4,892,171 A * | 1/1990 | Scheindel | ............... | F16N 21/04 184/105.1 |
| 5,520,665 A * | 5/1996 | Fleetwood | ............... | F16L 37/407 604/246 |
| 5,823,221 A * | 10/1998 | Stomp | ............... | B22D 1/005 137/15.01 |
| 5,868,224 A * | 2/1999 | DiCarlo | ............... | F16L 19/065 141/346 |
| 2014/0001711 A1* | 1/2014 | Chen | ............... | B23B 31/30 279/4.04 |

\* cited by examiner

JOINT STRUCTURE

FIELD

The present disclosure relates to joint structures, and particularly to a joint structure for transferring air or liquid.

BACKGROUND

A joint structure for transferring air or liquid may be coupled between two tubes. A joint plug and a joint outlet of the joint structure may be designed as columnar structures matching with each other.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The term "coupled" is defined as connected, whether directly or indirectly through intervening components, and is not necessarily limited to physical connections. The connection can be such that the objects are permanently connected or releasably connected.

Figure 1:
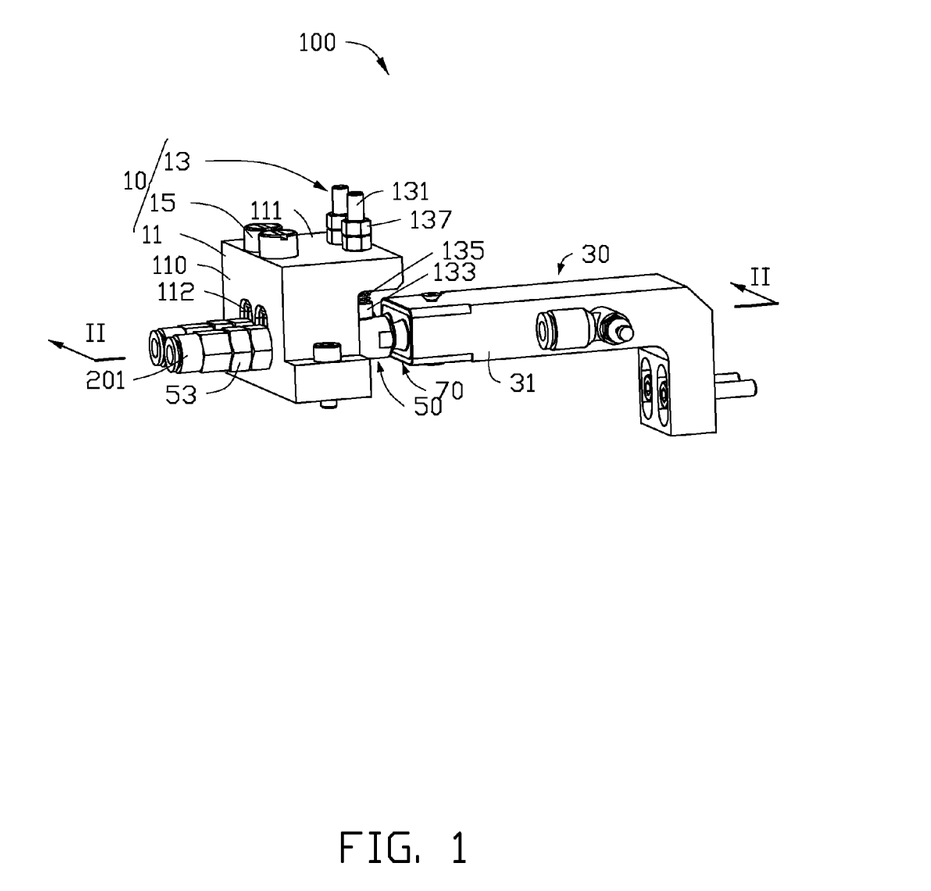
FIG. 1 is an isometric view of an embodiment of a joint structure in a state of use, the joint structure including a pin.
Figure 2:
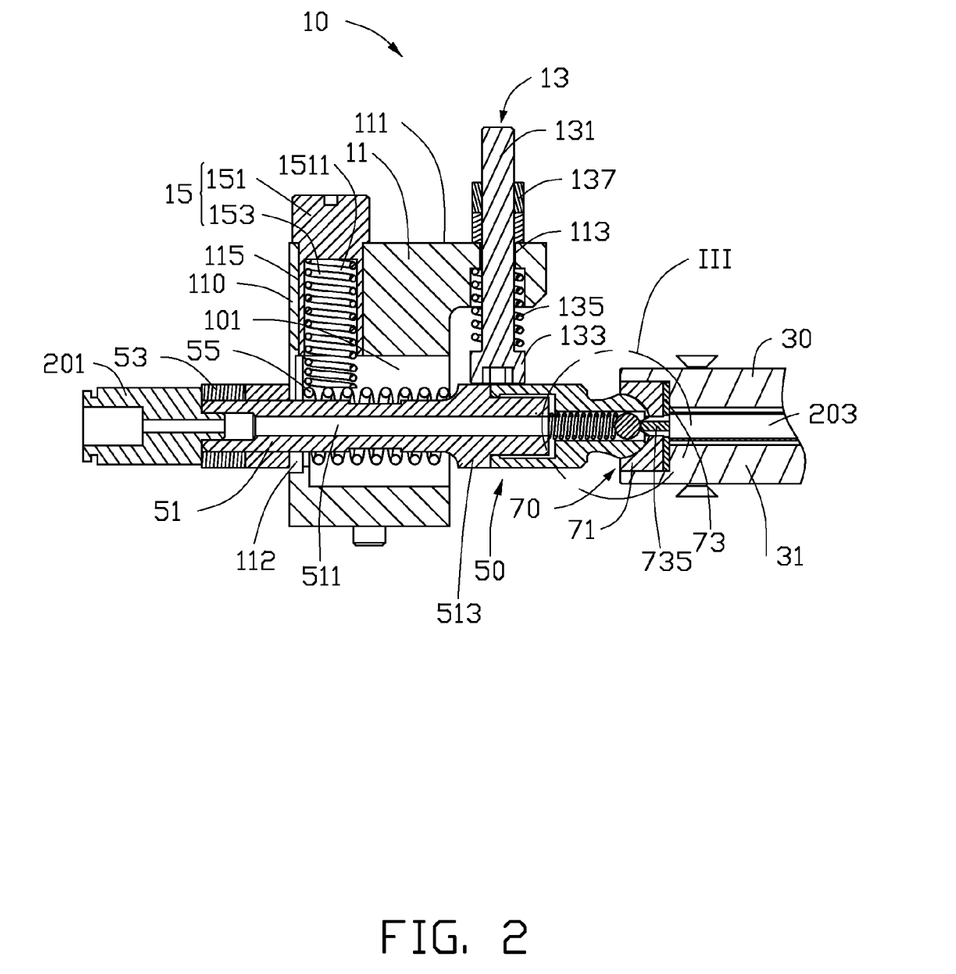
FIG. 2 is a sectional view of the joint structure of FIG. 1, taken along line II-II.

FIGS. 1 and 2 illustrate an embodiment of a joint structure 100 for joining an input tube 201 and an output tube 203 (shown in FIG. 2). Air or liquid can be transferred from the input tube 201 to the output tube 203 via the joint structure 100.

The joint structure 100 can include a fixing base 10, a support base 30, a joint plug assembly 50, and a joint outlet assembly 70. The joint plug assembly 50 can be mounted on the fixing base 10. The joint outlet assembly 70 can be fixedly mounted on the support base 30. The fixing base 10 and the support base 30 can be movable relative to each other to enable the joint plug assembly 50 to be coupled with the joint outlet assembly 70.

The fixing base 10 can include a base body 11, and a first recovering member 13 and a second recovering member 15 mounted on the base body 11. The base body 11 can be substantially cuboid and define a receiving chamber 101 for receiving the joint plug assembly 50. The base body 11 can include a first wall 110 and a second wall 111 substantially perpendicular to the first wall 110. The first wall 110 can define a first receiving portion 112. The first receiving portion 112 can communicate with the receiving chamber 101 and partially receive the joint plug assembly 50. In one embodiment, the joint plug assembly 50 is moveable through the first receiving portion 112. The second wall 111 can define a first through hole 113 and a second through hole 115. The first through hole 113 and the second through hole 115 can communicate with the receiving chamber 101. A central axis of the first through hole 113 can be substantially parallel to a central axis of the second through hole 115, and substantially perpendicular to a central axis of the first receiving portion 112. The first through hole 113 can be configured to receive the first recovering member 13, and the second through hole 115 can be configured to receive the second recovering member 15.

The first recovering member 13 can extend through the first through hole 113, such that an end portion of the first recovering member 13 can be coupled to the joint plug assembly 50. The first recovering member 13 can include a rod body 131, a flange 133 protruding outward from a first end portion of the rod body 131, a first elastic member 135 sleeved on the rod body 131 and adjacent to the flange 133, and a limiting member 137 fixed on a second end portion of the rod body 131 away from the flange 133. The rod body 131 can be received in the first through hole 113, and the flange 133 can abut the joint plug assembly 50. The second end portion of the rod body 131 extends out from the first through hole 113. The rod body 131 can be slidable along a central axis of the first through hole 113. The first elastic member 135 is sleeved on the rod body 131, such that opposite ends of the first elastic member 135 can abut the base body 11 and the flange 133, respectively. In the illustrated embodiment, the first elastic member 135 can be a spring. The limiting member 137 can be fixedly sleeved on the rod body and be located outside of the first through hole 113. The limiting member 137 can abut the second wall 111. When a first force is applied to the flange 133 toward the second wall 111, the rod body 131 can be forced to slide out of the first through hole 113, thereby deforming the first elastic member 135. When the first force is removed, the first elastic member 135 can restore to bias the rod body 131 to slide back into the first through hole 113, and the limiting member 137 to abut the second wall 111.

The second recovering member 15 can be received in the second through hole 115 and include a cylindrical body 151 and a second elastic member 153 partly received in the cylindrical body 151. The cylindrical body 151 can be fixedly received in the second through hole 115. An end surface of the cylindrical body 151 adjacent to the receiving chamber 101 can define a blind hole 1511 extending along a longitudinal direction of the cylindrical body 151. The second elastic member 153 can be received in the blind hole 1511. A first end portion of the second elastic member 153 can abut the joint plug assembly 50, and a second end portion of the second elastic member 153 can abut the cylindrical body 151.

The support base 30 can include a second receiving portion 31. The second receiving portion 31 can be located adjacent to a distal end of the joint plug assembly 50. The second receiving portion 31 can be configured to mount the joint plug assembly 50 to the output tube 203

Figure 3:
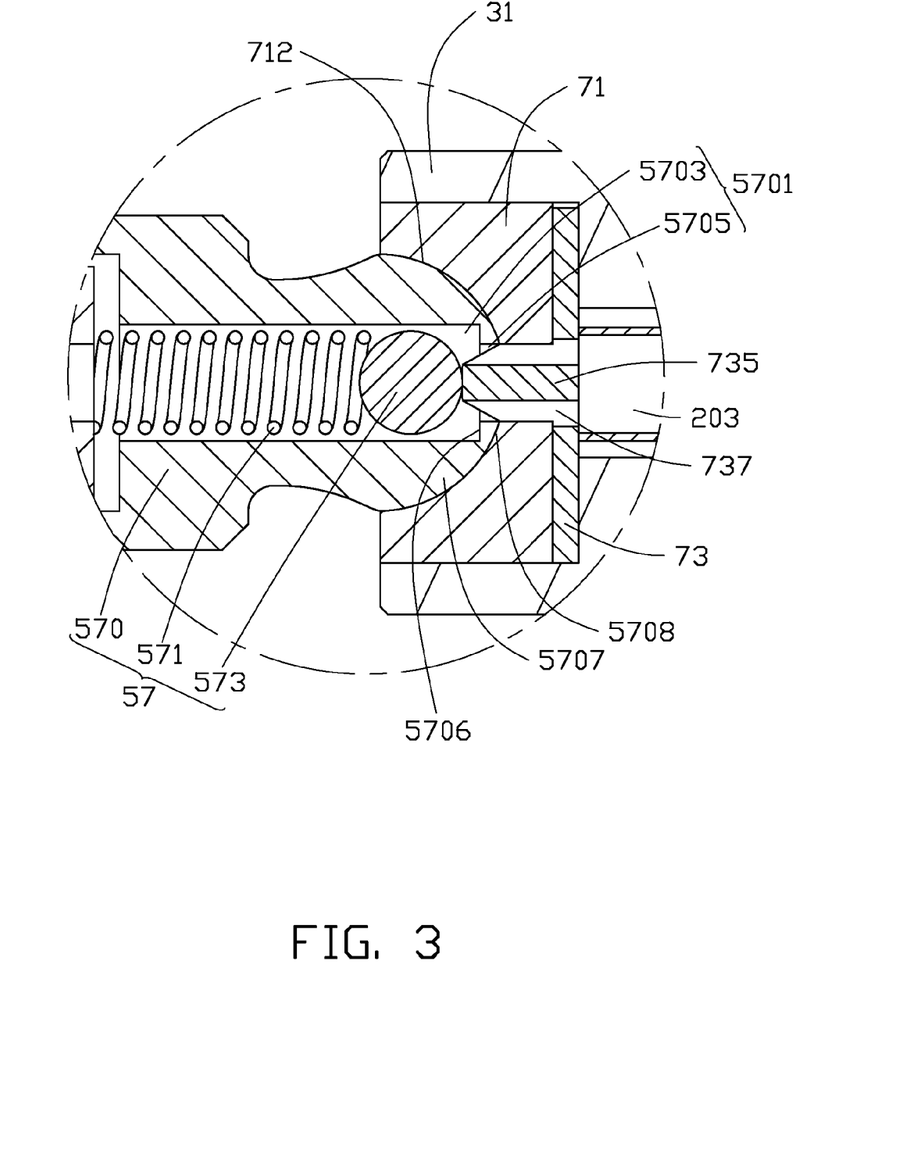
FIG. 3 is an enlarged view of circled portion III of the joint structure of FIG. 2.
Figure 4:
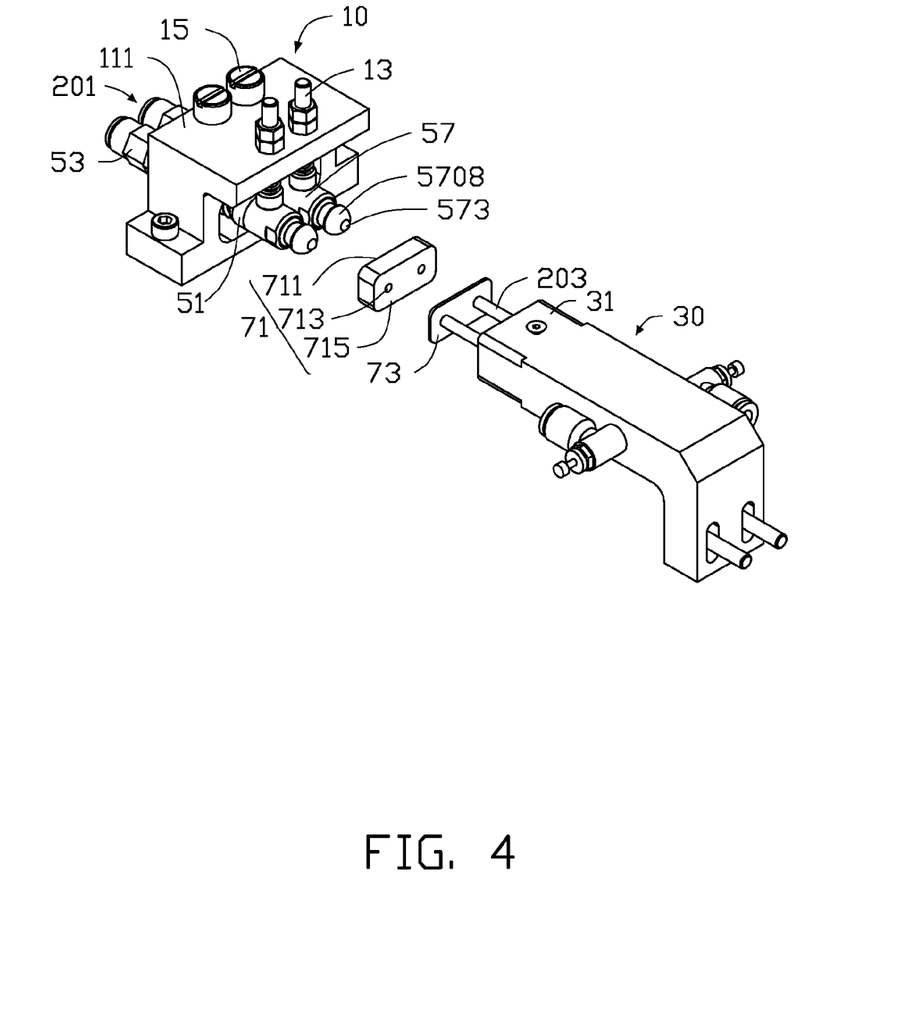
FIG. 4 is an exploded, isometric view of the joint structure in FIG. 1.
Figure 5:
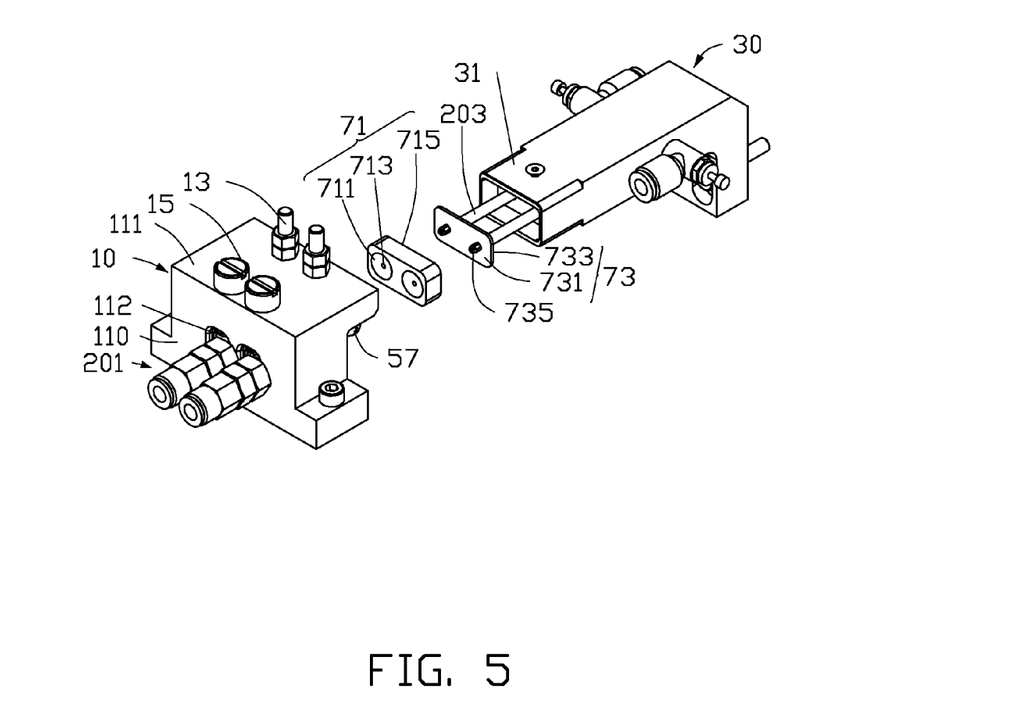
FIG. 5 is similar to FIG. 4, but viewed from another aspect.

FIGS. 1 to 3 illustrate that the joint plug assembly 50 includes a coupling member 51, an abutting member 53, a resilient member 55, and a joint plug 57. The coupling member 51 can define a passage 511 along a longitudinal direction thereof. A first end portion of the coupling member 51 can be coupled to the input tube 201, and a second end portion of the coupling member 51 can be coupled to the joint plug 57, thereby connecting the input tube 201 to the joint plug 57. The coupling member 51 can form a shaft shoulder 513 adjacent to the second end thereof. The shaft shoulder 513 can restrict the abutting member 53 from dropping from the coupling member 51.

The abutting member 53 can be sleeved on the coupling member 51 and be located adjacent to the first end of the coupling member 51. The abutting member 53 can abut the first wall 110. The resilient member 55 can be sleeved on the coupling member 51, and the first end of the second elastic member 153 can abut the resilient member 55. A first end portion of the resilient member 55 can abut the shaft shoulder 513, and a second end portion of the resilient member 55 can abut an inner surface of the first wall 110. When a second force is applied to the coupling member 51 towards the first wall 110, the shaft shoulder 513 can press the resilient member 55, such that the resilient member 55 deforms. When the second force is removed, the resilient member 55 can restore to recover the coupling member 51.

A first end portion of the joint plug 57 can be coupled to the coupling member 51, and a second end portion of the joint plug 57 can be engaged with the joint outlet assembly 70, thereby connecting the coupling member 51 to the joint outlet assembly 70. The joint plug 57 can include a plug body 570, a flexible member 571 received in the plug body 570, and a sealing member 573. The flange 133 of the first recovering member 13 can abut the coupling member 51 and the plug body 570 of the joint plug 57.

The plug body 570 can be substantially a hollow tube. The plug body 570 can define a receiving channel 5701 along a longitudinal direction thereof for receiving the flexible member 571 and the sealing member 573. The receiving channel 5701 can communicate with the passage 511 of the coupling member 51. The receiving channel 5701 can be a stepped through hole. The receiving channel 5701 can be divided into a first receiving hole 5703 and a second receiving hole 5705 communicating with the first receiving hole 5703. The first receiving hole 5703 is closer to the coupling member 51 than the second receiving hole 5705. A diameter of the first receiving hole 5703 can be larger than a diameter of the second receiving hole 5705. Thus, a stepped surface 5706 can be formed between the first receiving hole 5703 and the second receiving hole 5705. The stepped surface 5706 can be located adjacent to the joint outlet assembly 70. A latching portion 5707 can be formed at a distal end of the plug body 570. The latching portion 5707 can be substantially round and include a spherical outer surface 5708.

The flexible member 571 and the sealing member 573 can be received in the receiving channel 5701. A first end portion of the flexible member 571 can abut the coupling member 51, and a second end portion of the flexible member 571 can abut the sealing member 573. The sealing member 573 can be substantially spherical. A diameter of the sealing member 573 can be smaller than the diameter of the first receiving hole 5703, and be larger than the diameter of the second receiving hole 5705. When the sealing member 573 is in a non-use state, the flexible member 571 can bias the sealing member 573 to block the second receiving hole 5705. In the illustrated embodiment, the flexible member 571 can be a spring, and the sealing member 573 can be a steel ball.

FIGS. 1, 2, 4 and 5 illustrate that the joint outlet assembly 70 can include an outlet body 71, a pin base 73 adjacent to the outlet body 71, and a pin 735 located on the pin base 73.

The outlet body 71 can be received in the second receiving portion 31 of the support base 30 and correspond to the plug body 570. The outlet body 71 can be substantially cuboid and define a latching groove 711 at a side facing the latching portion 5707. The latching groove 711 can be substantially spherical. The latching groove 711 can include a substantially spherical inner surface 712 corresponding to the spherical outer surface 5708. The latching portion 5707 can be received in the latching groove 711, such that the spherical outer surface 5708 contacts the spherical inner surface 712. The outlet body 71 can define a through hole 713 communicating with the latching groove 711. The outlet body 71 can include a mounting surface 715 facing the first surface 731 of the pin base 73.

Figure 6:
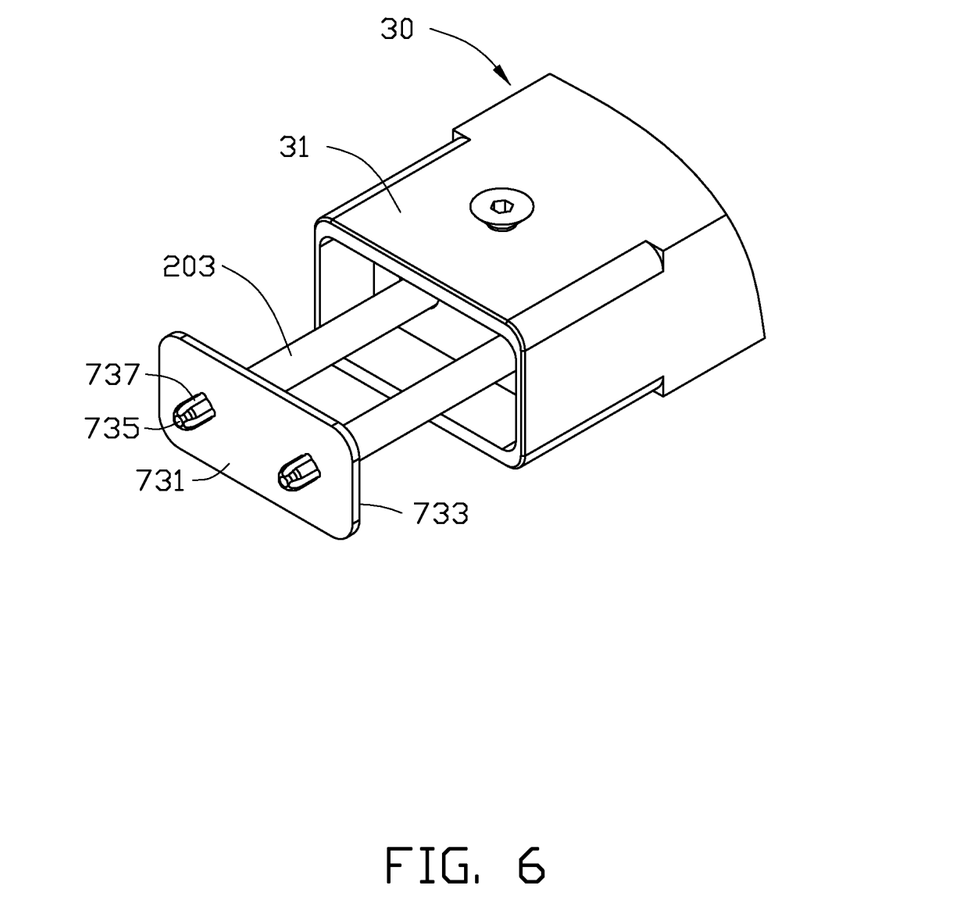
FIG. 6 is an enlarged, partial view of the pin of the joint structure in FIG. 4.

FIG. 6 illustrates that the pin base 73 can be a substantially rectangular plate. The pin base 73 can include a first surface 731 and a second surface 733 substantially parallel to the first surface 731. The first surface 731 can contact the mounting surface 715 of the outlet body 71. The second surface 733 can be coupled to the output tube 203.

The pin 735 can be substantially columnar and protrude from the pin base 73 towards the outlet body 71. The pin 735 can extend through the through hole 713 and be received in the latching groove 711. A diameter of the pin 735 can be smaller than a diameter of the second receiving hole 5705, to enable the pin 735 to extend into the receiving channel 5701 to push the sealing member 573. An outer surface of the pin 735 can define a plurality of grooves 737 for transferring air or liquid. In the illustrated embodiment, a number of the grooves 737 is four. The grooves 737 can extend to the second surface 733 and the output tube 203. When the pin 735 pushes the sealing member 573 and extends into the receiving channel 5701, the receiving channel 5701 can be coupled to the output tube 203 through the grooves 737.

In assembly, the sealing member 573 and the flexible member 571 can be received into the receiving channel 5701. The plug body 570 can be coupled with the coupling member 51, such that opposite ends of the flexible member 571 can abut the sealing member 573 and the coupling member 51. The resilient member 55 can be sleeved on the coupling member 51, such that the first end of the resilient member 55 can abut the shaft shoulder 513. The coupling member 51 can be inserted into the first receiving portion 112, and the second end of the resilient member 55 can abut the first wall 110. The abutting member 53 can be sleeved on the coupling member 51, and the input tube 201 can be coupled with the coupling member 51. The pin base 73 can be fixed to the outlet body 71, such that the pin 735 can extend through the through hole 713 and be received in the latching groove 711. The output tube 203 can be fixed to the second surface 733. The assembled joint outlet assembly 70 can be received in the second receiving portion 31. Thus, the output tube 203 can be received in the support base 30.

In use, the latching portion 5707 can be received within the latching groove 711. The pin 735 can push the sealing member 573 to extend into the receiving channel 5701, thus allowing the input tube 201 to be coupled to the output outlet 203 via the passage 511, the receiving channel 5701, and the grooves 737. Thus, the joint structure 100 can transfer air or liquid. Because the latching portion 5707 and the latching groove 711 are substantially spherical, the latching portion 5707 can be easily aligned with the latching groove 711, thus saving time and preventing damage to the plug 57. When the joint structure 100 is in a non-use state, the flexible member 571 can bias the sealing member 573 to block the receiving channel 5701, thus preventing dust and other debris from entering the joint plug 57.

In an alternative embodiment, the rod body 131, the flange 133, and the limiting member 137 can be omitted, such that an end of the first elastic member 135 can be fixed to the second wall 111, and an opposite end of the first elastic member 135 can abut the plug body 570. The cylindrical body 151 of the second recovering member 15 can be omitted, such that an end of the second elastic member 153 can be fixed to the second wall 111, and an opposite end of the second elastic member 153 can abut the resilient member 55. The fixing base 10 and the support base 30 can be omitted, such that the joint plug assembly 50 and the joint outlet assembly 70 can be located on worktables (not shown). The coupling member 51, the resilient member 55, and the abutting member 53 can be omitted, such that the plug body 570 can be directly coupled with the input tube 201. The flexible member 571 can abut the input tube 201 and the sealing member 573. The pin base 73 can be omitted, such that the pin 735 can be mounted within the latching groove 711 and extend to the mounting surface 715.

It is believed that the present embodiments and their advantages will be understood from the foregoing description, and it will be apparent that various changes can be made thereto without departing from the spirit and scope of the embodiments or sacrificing all of its material advantages.

What is claimed is:

1. A joint structure, coupling an input tube with an output tube, the joint structure comprising:
   a joint plug assembly for communicating with the input tube, comprising:
      a plug body defining a receiving channel along a longitudinal direction for communicating with the input tube, the receiving channel comprising a first receiving hole and a second receiving hole communicating with the first receiving hole, a latching portion being formed at a distal end of the plug body,
      a sealing member received in the first receiving hole, and
      a flexible member received in the first receiving hole, an end of the flexible member abutting the input tube, and an opposite end of the flexible member abutting the sealing member to make the sealing member to be partly received in the second receiving hole; and
   a joint outlet assembly for communicating with the output tube, and comprising:
      an outlet body for coupling with the output tube, the outlet body defining a latching groove to receive the latching portion, and
      a pin received in the latching groove, and defining at least one groove along a longitudinal direction, the at least groove communicating with the output tube,
   wherein the second receiving hole is located at a side of the first receiving hole adjacent to the outlet body, the pin is capable of being inserted into the second receiving hole to push the sealing member, thereby enabling the input tube to communicate with the at least one groove and the output tuber, and
   wherein the joint plug assembly further comprises a coupling member, a first wall, and a resilient member, the coupling member comprises a shaft shoulder adjacent to the plug body, the resilient member is sleeved on the coupling member, and opposite ends of the resilient member abut the shaft shoulder and the first wall, respectively.

2. The joint structure of claim 1, wherein the latching portion is substantially round, the latching groove is a substantially spherical groove matching with the latching portion.

3. The joint structure of claim 1, wherein a diameter of the first receiving hole is substantially larger than a diameter of the sealing member, a diameter of the second receiving hole is substantially smaller than a diameter of the sealing member, a stepped surface is located between the first receiving hole and the second receiving hole, the sealing member abuts the stepped surface.

4. The joint structure of claim 1, wherein the outlet body comprises a spherical inner surface received in the latching groove, the spherical inner surface defines a through hole, the pin is received in the through hole.

5. The joint structure of claim 4, wherein the joint outlet assembly further comprises a pin base, the pin base is located at a side of the outlet body away from the plug body, the pin extends from the pin base towards the latching groove, the pin base is capable of coupling with the output tube.

6. The joint structure of claim 1, wherein an end of the coupling member is coupled with the plug body, and an opposite end of the coupling member is capable of being coupled with the input tube, the coupling member defines a passage along a longitudinal direction, an end of the passage communicates with the input tube, an opposite end of the passage communicates with the receiving channel.

7. The joint structure of claim 6, wherein the joint plug further comprises a fixing base and a support base opposite to the fixing base, the first wall is perpendicular to the coupling member, the first wall defines a first receiving portion, the coupling member is received in the first receiving portion, the support base comprises a second receiving portion, the second receiving portion is located adjacent to the fixing base, the joint outlet assembly is fixedly received in the second receiving portion.

8. The joint structure of claim 7, wherein the joint plug assembly further comprises an abutting member, the abutting member is sleeved on the coupling member, and abuts the first wall.

9. The joint structure of claim 7, wherein the fixing base further comprises a second wall perpendicular to the first wall and a first recovering assembly mounted on the second wall, the first recovering assembly comprises a first elastic member, a center axis of the first elastic member is perpendicular to the plug body, opposite ends of the first elastic member abut the second wall and the plug body, respectively.

10. The joint structure of claim 9, wherein the fixing base further comprises a second recovering assembly mounted on the second wall, the second recovering assembly comprises a second elastic member, a center axis of the second elastic member is perpendicular to the resilient member, opposite ends of the first elastic member abut the second wall and resilient member, respectively.

11. A joint structure comprising:
   a joint plug assembly comprising:
      a plug body defining a receiving channel along a longitudinal direction, the receiving channel comprising a first receiving hole and a second receiving hole communicating with the first receiving hole, a diameter of the second receiving hole substantially smaller than that of the first receiving hole, the plug body comprising a spherical outer surface,
      a sealing member received in the first receiving hole, and
      a flexible member received in the first receiving hole, and biasing the sealing member to block the second receiving hole; and
   a joint outlet assembly comprising:
      an outlet body defining a latching groove, and comprising a spherical inner surface received in the latching groove, and
      a pin received in the latching groove, and defining at least one groove along a longitudinal direction,
   wherein when the spherical outer surface of the plug body is received in the latching groove, the pin is capable of being inserted into the second receiving hole to push the sealing member and open the second receiving hole, and wherein the joint plug assembly further comprises a coupling member, a first wall, and a resilient member, the coupling member comprises a shaft shoulder adjacent to the plug body, the resilient member is sleeved on the coupling member, and opposite ends of the resilient member abut the shaft shoulder and the first wall, respectively.

12. The joint structure of claim 11, wherein plug body further comprises a latching portion that is substantially round, the spherical outer surface is located at an outer surface of the latching portion, the latching groove is a substantially spherical groove matching with the latching portion.

13. The joint structure of claim 11, wherein a diameter of the first receiving hole is substantially larger than a diameter of the sealing member, a diameter of the second receiving hole is substantially smaller than a diameter of the sealing member, a stepped surface is located between the first receiving hole and the second receiving hole, the sealing member abuts the stepped surface.

14. The joint structure of claim 11, wherein the spherical inner surface defines a through hole, the pin is received in the through hole.

15. The joint structure of claim 14, wherein the joint outlet assembly further comprises a pin base, the pin extends from the pin base towards the latching groove.

16. The joint structure of claim 11, wherein the coupling member is coupled with the plug body, the coupling member defines a passage along a longitudinal direction, the passage communicates with the receiving channel.

17. The joint structure of claim 16, wherein the joint plug further comprises a fixing base and a support base opposite to the fixing base, the first wall is perpendicular to the coupling member, the first wall defines a first receiving portion, the coupling member is received in the first receiving portion, the support base comprises a second receiving portion, the joint outlet assembly is fixedly received in the second receiving portion.

18. The joint structure of claim 17, wherein the joint plug assembly further comprises an abutting member, the abutting member is sleeved on the coupling member, and abuts the first wall.

19. The joint structure of claim 17, wherein the fixing base further comprises a second wall perpendicular to the first wall and a first recovering assembly mounted on the second wall, the first wall defines a first through hole, the first recovering assembly comprises a rod body, a flange protruding outwardly from a distal end of the rod body, a first elastic member sleeved on the rod body, and a limiting member fixed on an end of the rod body opposite to the flange, the rod body is received in the first through hole, opposite ends of the first elastic member abut the second wall and the flange, respectively, the flange abuts the plug body.

20. The joint structure of claim 19, wherein the fixing base further comprises a second recovering assembly mounted on the second wall, the second wall further defines a second through hole, the second recovering assembly comprises a cylindrical body received in the second through hole and a second elastic member partly received in the cylindrical body, opposite ends of the first elastic member abut the cylindrical body and resilient member, respectively.

* * * * *